United States Patent

Albright

[15] 3,672,412
[45] June 27, 1972

[54] APPARATUS FOR FELLING TREES

[72] Inventor: Alva Z. Albright, Woodstock, Ontario, Canada

[73] Assignee: Eaton Yale & Towne Canada Limited, London, Ontario, Canada

[22] Filed: Jan. 4, 1971

[21] Appl. No.: 103,482

[52] U.S. Cl. ..................143/32 N, 144/34 A, 144/3 D, 144/309 AC
[51] Int. Cl. ................A01g 23/08, B27b 17/02, B27g 19/00
[58] Field of Search ...............143/32 R, 32 N, 43 N, 68 H; 144/34 R, 34 A, 34 E, 3 D, 309 AC

[56] References Cited

UNITED STATES PATENTS

| 3,140,736 | 7/1964 | Propst | 144/3 D |
| 3,604,479 | 9/1971 | Jordan | 143/32 N |
| 3,638,694 | 2/1972 | Robinson | 144/34 A |

FOREIGN PATENTS OR APPLICATIONS

| 848,216 | 8/1970 | Canada | 144/34 A |

Primary Examiner—Donald R. Schran
Attorney—Teagno & Toddy

[57] ABSTRACT

A chain saw adapted to be mounted on a vehicle such as a skidder, and a pusher bar mounted on the chain saw frame and operable to apply a felling force against the tree as the saw cuts through it. The pusher bar includes a hollow support member which surrounds the pusher actuating mechanism to both protect the mechanism and permit the pusher bar to be folded flat against the frame to minimize the overall height of the attachment.

6 Claims, 4 Drawing Figures

INVENTOR.
ALVA Z. ALBRIGHT
BY
TEAGNO & TODDY
ATTORNEYS

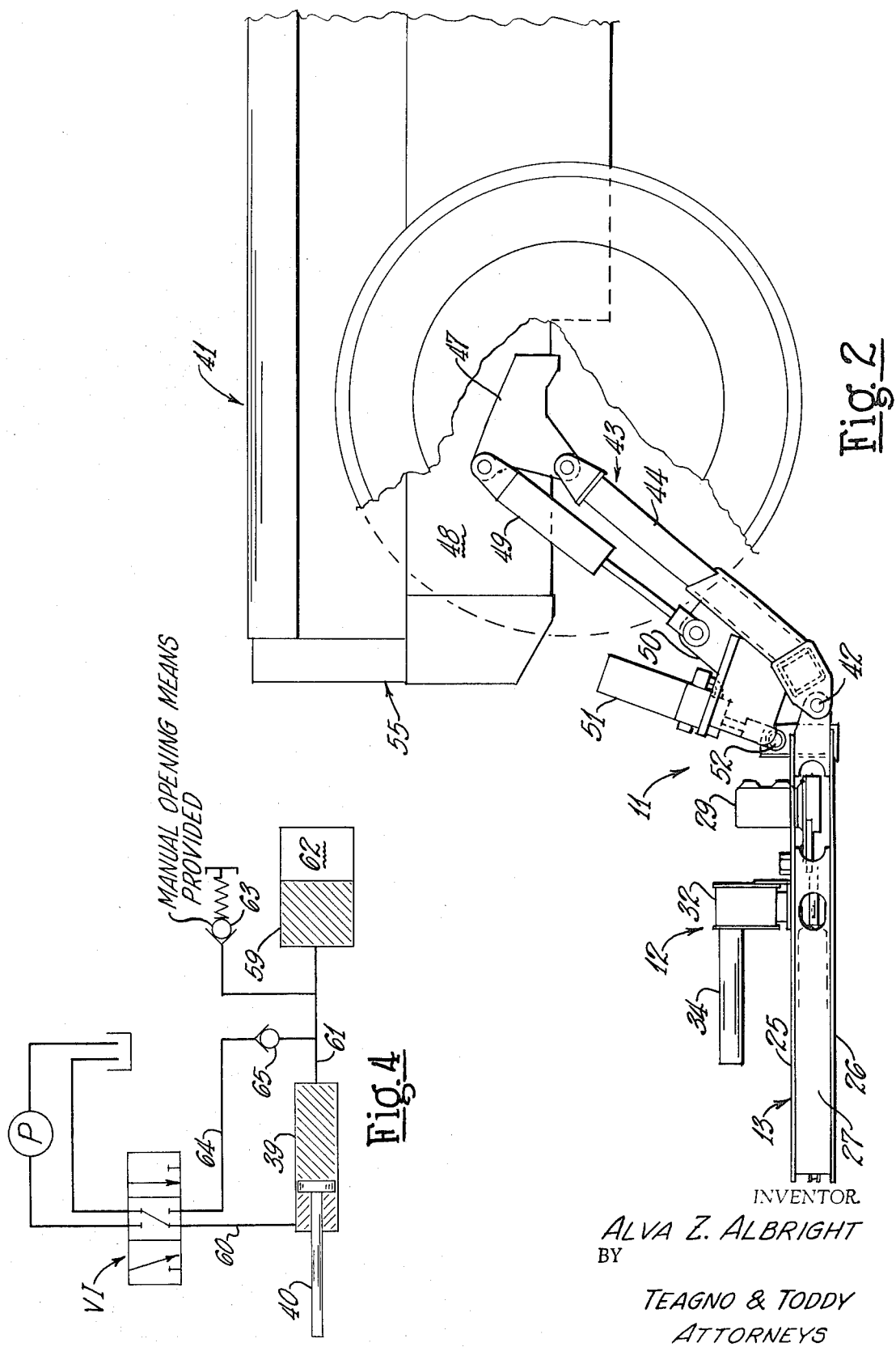

APPARATUS FOR FELLING TREES

The invention relates generally to saws and more particularly to a chain saw including a pusher to facilitate felling trees.

A chain saw attachment adapted to be mounted on a log skidder is disclosed in U.S. Pat. application Ser. No. 766,032, filed in the name of Alva Z. Albright on Oct. 3, 1968. The present invention provides novel pusher means operating in conjunction with such a chain saw to achieve directional felling and to prevent binding of the saw as it cuts through a tree.

Accordingly, it is an object of the invention to provide apparatus for directionally felling trees.

Another object of the invention is to provide such directional felling in association with a chain saw.

Another object of the invention is to provide pusher means engageable with a tree to provide directional felling.

Another object of the invention is to provide pusher means, for a skidder-mounted chain saw attachment, which is retractable to facilitate transporting of the attachment from job to job.

Another object of the invention is to provide a pivotally mounted pusher wherein the relationship between the tree engaging portion thereof and the pivot point is such that locking of the pusher to the tree as the tree is cut through is obviated.

To accomplish the above objectives, the present invention provides a chain saw attachment including a pusher bar which is engageable with the tree to be felled and operable to exert a force against the tree in the desired direction of felling. The pusher comprises a tree engaging bar and a support member pivotally mounted on the saw attachment frame. The pushing force is provided by a linear actuator acting between the saw frame and the support member. The support member is hollowed out such that when it is fully retracted it encloses the linear actuator. By virtue of this construction the pusher does not add to the overall height of the attachment and enables the attachment to be folded flat against the front of a skidder during transport. The relative positions of the pusher bar pivot, the bar, and the saw chain are such that the pusher bar always tends to move upward until the tree falls, thus preventing the bar from locking to the tree as the tree pivots on the stump.

According to one embodiment of the invention the linear actuator for the pusher bar is a hydraulic cylinder operating directly off the hydraulic system of a vehicle, and according to another it is an hydraulic cylinder operating in association with a gas accumulator.

Other objects and advantages of the invention will be apparent from the following description when taken in connection with the accompanying drawings, wherein:

FIG. 2 is a side elevation view of a chain saw attachment mounted to the front of a skidder;

FIG. 4 is a schematic diagram of a hydraulic circuit for operating the pusher assembly of the present invention.

Figure 1:
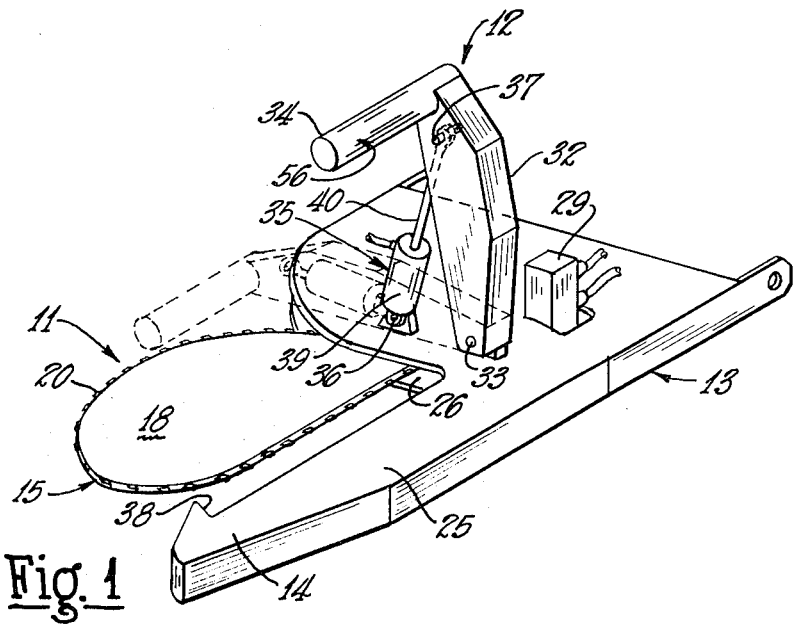
FIG. 1 is a perspective view of a chain saw attachment constructed in accordance with the present invention.
Figure 3:
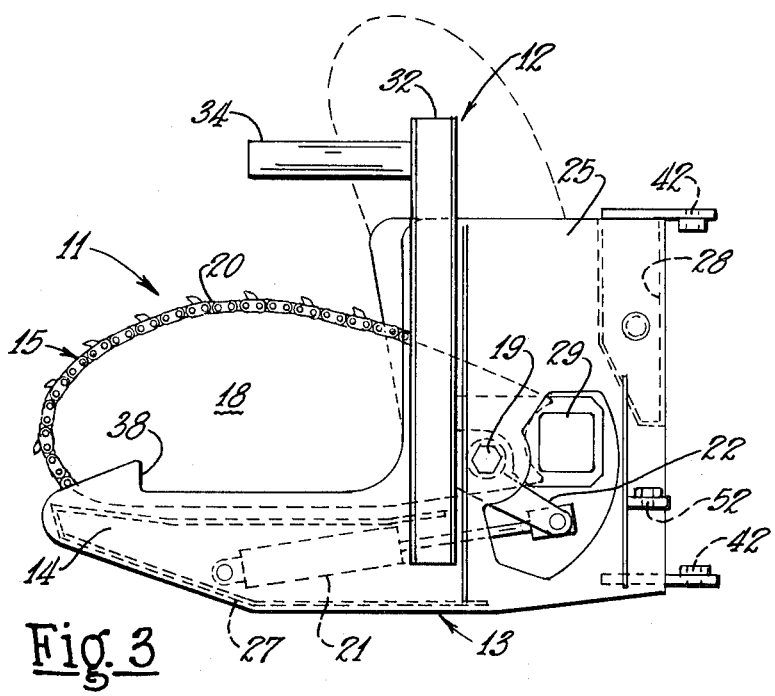
FIG. 3 is a plan view of the chain saw attachment.

Referring particularly to FIGS. 1 and 3, the invention comprises a chain saw attachment designated generally by the numeral 11, to which has been added a pusher assembly, designated generally by the numeral 12.

The chain saw comprises a frame 13, an anvil 14 extending forward from the frame and which can be formed as an extension of the frame as shown, and a chain assembly 15. The chain assembly consists of a cutter bar 18 pivotally mounted at 19 on the frame 13, the saw chain 20 which is adapted to rotate around the cutter bar in a conventional manner, and means for rotating the chain and for urging the cutter bar into engagement with a tree. In the embodiment illustrated, the cutter bar 18 is moved into and out of engagement with a tree by means of a linear actuator 21 acting on a pivot arm 22 attached to the cutter bar 18. The frame 13 is made up of upper and lower plates 25 and 26 respectively, separated by web members, e.g., 27 and 28, and the actuator 21 is located between the plates as shown in FIG. 3.

The chain 20 can be driven about the cutter bar 18 by any convenient means; however, in the illustrative embodiment a rotary hydraulic motor 29 is used.

The pusher assembly 12 comprises a support member 32, which is pivotally mounted at 33 on the upper plate 25 of the frame 13, a pusher bar 34 welded or otherwise attached to the free end of the support member, and a linear actuator 35, pivotally attached at 36 to the frame 13 and at 37 to the support member 32, as shown in FIG. 1. The support member 32 is a three-sided fabricated structure with the open side facing the linear actuator such that when the ram 40 of actuator 35 is fully retracted the support member 32 is folded flat against the top of the frame 13, as shown in FIGS. 2 and 3.

In FIG. 2 the chain saw attachment 11 is shown mounted on the front of a wheeled skidder, designated generally by the numeral 41, making use of the dozer blade attachment points provided thereon. For this purpose the frame 13 includes pivotal attachment points 42, adapted to be received by a lift and tilt assembly 43 as shown in FIG. 2.

Essentially, the lift and tilt assembly 43 comprises a support member 44 extending forward and downward from a bracket 47 on the skidder frame 48, and which receives the chain saw at attachment points 42; a lift cylinder 49 extending between the bracket 47 and a mounting frame 50 at the lower end of the support member 44, and a tilt cylinder 51 extending between the mounting frame 50 and the frame 13 of the chain saw attachment. The lift cylinder is pivotally attached at one end to the bracket 47 and at the other end to the mounting frame 50. In the embodiment illustrated the tilt cylinder is rigidly mounted on the frame 50, and is pivotally mounted to the attachment at 52.

By coordinating the operation of the tilt and lift cylinders the chain saw attachment can be lifted relative to the ground while being maintained substantially parallel thereto in position to make a cut, or the attachment can be folded substantially flat against the front face 55 of the skidder 41. It can be appreciated from viewing FIG. 2 that because of the nature of the equipment normally required to operate the chain saw and because of the relative location of the pusher thereon, the pusher assembly 12, when retracted as in FIG. 2, does not add significantly to the overall size of the chain saw attachment.

OPERATION

At the beginning of a typical felling cycle, the chain saw attachment will be positioned substantially as it is shown in FIG. 2, with the pusher retracted. As the skidder is wheeled up to a tree, with the cutter bar 18 in its open position as shown in broken line in FIG. 3, the lift and tilt cylinders 49 and 51 can be manipulated to place the attachment in proper position for cutting. The actuator 35 of the pusher is then extended to move the pusher from the broken line position of FIG. 1 to approximately the full line position, or until the face 56 of pusher bar 34 is in contact with the tree. Thereafter, the actuator 35 is kept pressurized to exert a felling force on the tree.

The chain saw is put in operation by energizing the hydraulic motor 29 to rotate the chain 20 about the cutter bar 18, and then extending the ram 23 of actuator 21 to pivot the cutter bar 18 toward the anvil 14 and into engagement with the tree. The actuator 21, as shown, is a double acting hydraulic cylinder and the pressure applied can be controlled as required to force the saw into the tree.

As illustrated in FIG. 1, the pivot point 33 of the support member 32 of the pusher is substantially aligned with the edge 38 of the anvil 14 or spaced therefrom toward the outer edge of the frame 13 (bottom of FIG. 3). Thus, the contact point of the pusher bar 34 with the tree (face 56) will always be behind the pivot point 33, by at least the thickness of the tree, until the tree starts to fall. As a result, the pusher bar will always be moving upward into the tree as the saw is cutting. As the tree just starts to fall, it will pivot on the rear edge of the stump, causing the side of the tree in contact with the pusher to move upward. According to the present invention the pusher bar will tend to follow this upward movement and then kick out when the tree falls.

The linear actuator 35 associated with the pusher assembly 12 can be a hydraulic cylinder 39, supplied with pressurized fluid directly by the power take-off system of the skidder 41; however, according to one aspect of the invention the actuator 35 is pressurized by a gas accumulator, which serves to conserve power during the cutting cycle.

Gas accumulators are well known in the art and will not be described in detail herein. In FIG. 4 there is illustrated an accumulator system comprising a pump P, which may be part of the power take-off system of a vehicle, a control valve VI, the hydraulic cylinder 39, an accumulator 59, and associated relief and check valves.

Referring to FIG. 4, to charge the accumulator 59 and put the pusher assembly in condition for operation, the valve VI is moved to the left, pressurizing line 60 to the rod end of cylinder 39. Hydraulic pressure moves the ram 40 to the right as shown in FIG. 4, the fluid on the head end of cylinder 39 acting through line 61 to the accumulator 59 to compress an inert gas contained within a chamber 62 therein above the hydraulic fluid. When the set pressure of relief valve 63 is reached, the ram 40 will continue to move as necessary until it is fully retracted, with any excess hydraulic fluid being dumped back to the sump. At this point, the accumulator is fully charged and no additional hydraulic power is required until a cutting cycle is completed.

To actuate the pusher assembly, valve VI is moved to its neutral position, relieving hydraulic pressure on the rod end of the cylinder 39 back to the sump via line 60. With the rod end of cylinder 39 depressurized, the ram 40 of cylinder 39 extends under the influence of the gas pressure in chamber 62.

When the cutting cycle is completed, the valve VI is returned to the left to again pressurize the rod end of cylinder 39.

When felling operations are completed and the saw attachment is to be moved to a new location, it is highly desirable to have the pusher assembly retracted with no pressure on the accumulator so that in the event of a rupture or leak at the rod end of cylinder 39, the pusher will not extend. To accomplish this means are provided to manually open relief valve 63, thus relieving accumulator pressure by dumping hydraulic fluid back to the sump.

It can be appreciated that after such relieving of accumulator pressure it is necessary to recharge the accumulator independent of movement of the ram 40. This is done by moving VI to the right, pressurizing line 64 through check valve 65 to return hydraulic fluid to the accumulator. Again, the gas in chamber 62 will become pressurized to relief valve pressure to put the accumulator in condition for another felling cycle.

I now claim:

1. In a tree cutting apparatus including a frame,
a cutter bar pivotally attached to said frame,
a saw chain mounted for rotation around said cutter bar,
power means for driving said chain about said cutter bar, and
means for pivoting said cutter bar into and out of engagement with a tree to be cut;
the improvement comprising:
a pusher assembly mounted on said frame and engageable with said tree, said pusher assembly comprising:
a support member pivotally mounted at one end to said frame,
a pusher bar adapted to engage the trunk of said tree attached to the free end of said support member, and
a pressure cylinder acting between said frame and said support member for moving said support member between a first position adjacent said frame to a second position pivoted upwardly therefrom to urge said pusher bar into engagement with said tree, said support member comprising a three-sided member defining a cavity enclosing said pressure cylinder when said support member is in said first position.

2. The improvement according to claim 1, in which said means for moving said support member comprises a hydraulic cylinder, and accumulator means operable to selectively pressurize said hydraulic cylinder.

3. The improvement according to claim 2, in which said accumulator means comprises an accumulator cylinder, a gas chamber within said cylinder, and means associated with said hydraulic cylinder and a source of hydraulic pressure for introducing pressurized hydraulic fluid into said accumulator cylinder, thereby compressing said gas in said chamber.

4. The improvement according to claim 3, including means for relieving pressure within said accumulator when said support member is in said first position.

5. The improvement according to claim 1, in which the relative locations of the pivot point of said support member, said pusher bar, and said saw chain are such that said pusher bar always moves upward away from said frame as said saw chain cuts through a tree and the tree tends to pivot on its stump under the influence of a felling force applied by said pusher assembly.

6. In a tree cutting apparatus adapted for attachment to a vehicle, including:
a frame,
a cutter bar pivotally attached to said frame,
a saw chain mounted for rotation around said cutter bar,
power means for driving said chain about said cutter bar,
means for pivoting said cutter bar into and out of cutting engagement with a tree,
attachment means pivotally attached at one end to said vehicle and at an opposite end to said frame, and
means for pivoting said frame on said attachment means from a substantially horizontal operative position to a substantially vertical inoperative position;
the improvement comprising:
a pusher assembly operable to exert a felling force against a tree engaged by said saw chain, said pusher assembly comprising:
an elongated support member pivotally mounted on said frame,
a pusher bar attached to said support member in position to engage a tree being cut by said saw chain, and
a pressure cylinder acting between said frame and said support member for urging said pusher bar into engagement with the tree, said urging means being operable to retract said support member to a position substantially flat against said frame, whereby movement of said frame from its operative to its inoperative position is not inhibited, said support member having a cavity formed therein capable of enclosing said pressure cylinder when said support member is in its retracted position.

* * * * *